(12) United States Patent
Yu et al.

(10) Patent No.: US 9,071,065 B2
(45) Date of Patent: Jun. 30, 2015

(54) ELECTRICAL POWER SUPPLY APPARATUS AND CONTROLLING METHOD THEREOF

(75) Inventors: Wei-Cheng Yu, Taipei County (TW); Yun-Chieh Hsu, Changhua County (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 508 days.

(21) Appl. No.: 13/590,813

(22) Filed: Aug. 21, 2012

(65) Prior Publication Data

US 2012/0319488 A1    Dec. 20, 2012

Related U.S. Application Data

(63) Continuation-in-part of application No. 12/755,503, filed on Apr. 7, 2010, now abandoned.

(30) Foreign Application Priority Data

Jan. 15, 2010   (CN) .......................... 2010 1 0019532

(51) Int. Cl.
| | |
|---|---|
| H02J 9/00 | (2006.01) |
| G06F 1/32 | (2006.01) |
| H02M 7/06 | (2006.01) |
| G06F 1/26 | (2006.01) |
| H02M 1/10 | (2006.01) |
| H02M 1/00 | (2007.01) |

(52) U.S. Cl.
CPC . *H02J 9/005* (2013.01); *G06F 1/32* (2013.01); *H02M 7/06* (2013.01); *H02M 2001/0032* (2013.01); *Y02B 70/16* (2013.01); *G06F 1/266* (2013.01)

(58) Field of Classification Search
USPC .......................................................... 307/29
See application file for complete search history.

(56) References Cited

U.S. PATENT DOCUMENTS

2009/0321710 A1    12/2009   Krusin-Elbaum et al.

FOREIGN PATENT DOCUMENTS

| TW | M298173 | 9/2006 |
|---|---|---|
| TW | 200844705 | 11/2008 |
| TW | M353409 | 3/2009 |

*Primary Examiner* — Robert Deberadinis
(74) *Attorney, Agent, or Firm* — Li & Cai Intellectual Property (USA) Office

(57) ABSTRACT

Disclosed is an electrical power supply apparatus, comprising a switch circuit, an output circuit, single-direction pass circuit and a control circuit. The output circuit is used for outputting a supply of main power source. The standby circuit is used for providing a supply of standby power source. The control circuit is for being capable of controlling the switch circuit according to a state of the external power source, wherein when the external power source is on, the switch circuit is in a cutoff state for allowing a first period or a second period of a power signal of the external power source transferred to the standby circuit through the single-direction pass circuit.

20 Claims, 5 Drawing Sheets

ELECTRICAL POWER SUPPLY APPARATUS AND CONTROLLING METHOD THEREOF

CROSS-REFERENCE TO RELATED APPLICATION

This is a continuation-in-part application of patent application Ser. No. 12/755,503 filed on Apr. 7, 2010, which claims the priority benefit of China patent application serial no. 201010019532.1, filed Jan. 15, 2010 and is now abandoned. The entirety of each of the above-mentioned patent applications is hereby incorporated by reference herein and made a part of this specification.

BACKGROUND OF THE INVENTION

1. Field of the Invention

The present invention relates to an electrical power supply apparatus, and more particularly, to a controlling method of an electrical power supplier in a standby operating mode.

2. Description of Related Art

With the advancement of technology in modern life, a variety of electronic devices providing various different functions are facilitated to accelerate the multimedia communication among people, e.g., a television, a computer, a workstation, a domain, etc., and also require a larger and more stable power supply quality correspondingly. A lot of daily activities are depending on computer equipment, e.g., work, game, communication, and data processing. Therefore, the computer equipment must be able to function steadily so as to facilitate people to use them. At present, conventional computer equipment generally include central processing units, i.e. CPU, chipsets, memory units, storage devices, interface connection devices, and electrical power supply. Herein, the electrical power supply is capable of providing electrical power with stable voltage, so that power signals provided from an external source, e.g. the public electrical power distribution system, convert to power signals with various voltage levels required by the computer's internal circuitry, e.g. +5V, +/−12V, or +3.3V, etc., to facilitate the stable operations of computer equipment.

When the computer equipment connect to the external power source, the computer equipment are able to function in a normal operating mode, a sleeping mode, a standby operating mode, or an off mode. Yet, to prevent the energy crisis and global warming phenomena from being more critical, a variety of different criteria are set by government organization for power consumption associated with different operating modes.

Specifications related to the power consumption trend are increasingly strict, for example, the European Union's (EU) Energy Using Products (EuP) Directive for computer equipment. The draft implementing measures for power consumption associated with internal power supply (IPS) of computer equipment in a standby mode, i.e. standby power consumption, were announced in October, 2008 at the third meeting of the EuP Directive. Herein, power consumption in a standby operating mode has made the following criteria: (1) From Jan. 7, 2010, power consumption in a standby mode must be less than 1 W; (2) From 2013, power consumption in a standby mode must be less than 0.5 W. In other words, power supply devices must be able to incorporate with backend plants under the condition that the minimum output current is around 50 mA to 60 mA to consume power less than 1 W or less than 0.5 W further. However, conventional power supply devices are unable to reach the harsh conditions.

Referring to FIG. 1, in which a system schematic diagram of a conventional power supply device is demonstrated.

Referring to FIG. 2, in which a curve diagram in accordance with power consumption of the conventional power supply device in a standby mode is demonstrated.

A conventional power supply device 1 includes a rectifying circuit 11, connected to an external power source 10 for receiving an external power signal and rectifying the external power signal to form a rectification signal; a power factor corrector 12, connected to the rectifying circuit 11, for receiving the rectification signal, correcting current harmonic distortion, and outputting a stable DC signal; an output circuit 13, connected to the power factor corrector 12, for receiving the DC signal and transforming the DC signal into various main power sources with different voltage levels to drive the computer equipments; additionally, a standby circuit 14, connected to the power factor corrector 12 and connected to the output circuit 13 in parallel, for transferring the DC signal to the standby circuit 14 as the output circuit 13 is shutting down, so that the computer equipments is able to maintain in a standby state by applying a minimum standby power consumption under a standby operating mode, e.g., 5V.

The strategy, adapted for low power consumption in accordance with the conventional power supply device 1 is to utilize a standby circuit 14 with lower power consumption to output a standby current under a standby operating mode, so that the computer equipments are able to enter in the standby mode and save power consumption came from output circuit 13. Yet by applying the above mentioned method, power consumption of the conventional power supply device 1 is unable to meet the strict specifications for power consumption. As shown in FIG. 2, as the operating current is at 50 mA to 60 mA, the power consumption is around 06 W to 0.7 W, such that it can't meet the requirements with respect to the EuP Directive in 2013.

SUMMARY OF THE INVENTION

In view of the aforementioned issues, an embodiment according to the present invention provides an electrical power supply apparatus, comprising a switch circuit, an output circuit, single-direction pass circuit and a control circuit. The output circuit which is connected to an external power source is used for outputting a supply of main power source. The standby circuit which is connected to an external power source and the output circuit is used for providing a supply of standby power source. The single-direction pass circuit which is connected to the external power source, the output circuit and the standby circuit. The control circuit, connected to the external power source, for being capable of controlling the switch circuit according to a state of the external power source, wherein when the external power source is on, the switch circuit is in a cutoff state for allowing a first period or a second period of a power signal of the external power source transferred to the standby circuit through the single-direction pass circuit. Moreover, when the output circuit is in a conduction state and the external power source is on, the switch circuit is in the conduction state for allowing the first period or the second period of the power signal of the external power source transferred to the output circuit and the standby circuit through the single-direction pass circuit or the rectifying circuit.

In view of the aforementioned issues, a controlling method of an electrical power supply apparatus according to the present invention is provided. The method comprises the steps of: transferring a power signal to a output circuit through a single-direction pass circuit or a rectifying circuit when the electrical power supply apparatus is in a normal operating mode; and controlling a switch circuit by way of a control circuit when the electrical power supply apparatus is in a standby operating mode, such that a first period or a second period of the power signal is transferred to a standby circuit through the single-direction pass circuit.

The technique proposals according to the present invention are obviously different than the conventional technique, in which the controlling method in accordance with the electrical power supply apparatus in a standby operating mode are provided for achieving minimum power consumption and precisely controlling the discharging time of the bulk capacitor, such that the discharging time is not affected even if the standby power consumption is reduced, thereby enhancing stability of the electrical power supply apparatus. And the aforementioned controlling method of the electrical power supply is obviously in conformity with the strict standards of the EuP Directive, to promote industrial upgrading.

In order to further understand the techniques, means and effects the present invention, the following detailed description and included drawings are hereby referred, such that, through which, the purposes, features and aspects of the present invention can be thoroughly and concretely appreciated; however, the included drawings are provided solely for reference and illustration, without any intention to be used for limiting the present invention.

DETAILED DESCRIPTION OF THE PREFERRED EMBODIMENTS

Figure 1:
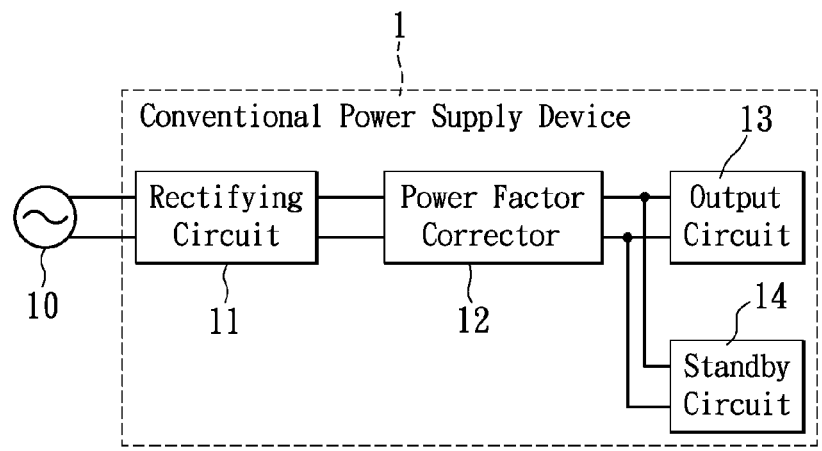
FIG. 1 illustrates a system schematic diagram of a conventional power supply device.
Figure 2:
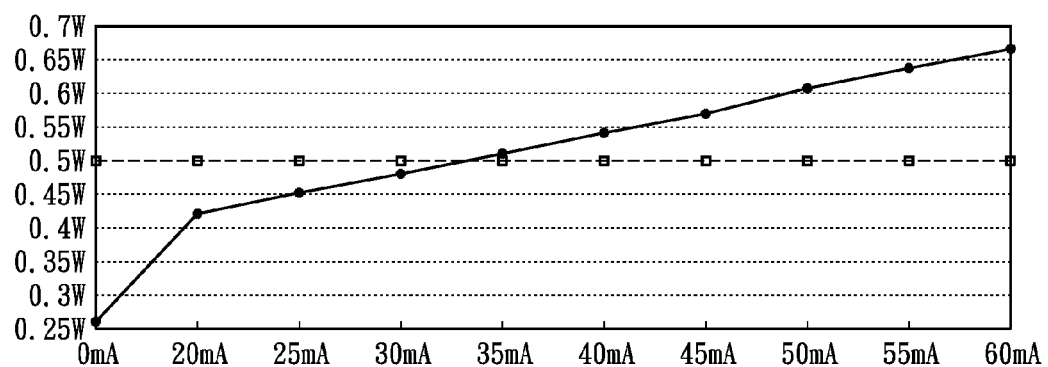
FIG. 2 illustrates a curve diagram in accordance with power consumption of the conventional power supply device in a standby mode.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure.

As used herein, the term "and/or" includes any and all combinations of one or more of the associated listed items.

Figure 3:
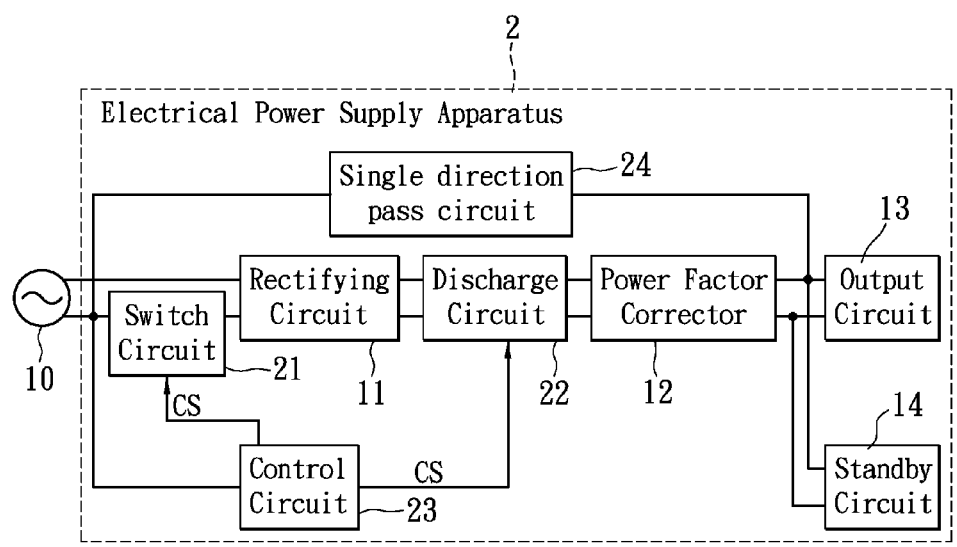
FIG. 3 shows a system schematic diagram of the electrical power supply apparatus according to one embodiment of the present invention.

Please refer to FIG. 3, FIG. 3 shows a system schematic diagram of the electrical power supply apparatus according to one embodiment of the present invention. The electrical power supply apparatus 2 includes a rectifying circuit 11, a power factor corrector 12, an output circuit 13, a standby circuit 14, a switch circuit 21, a discharge circuit 22, a control circuit 23 and a single-direction circuit 24.

The rectifying circuit 11 which is electrically connected to an external power source 10 by way of the switch circuit 21 is for receiving an power signal of the external power source 10 and rectifying the power signal to generate a rectification signal. The discharge circuit 22 which is connected between the rectifying circuit 11 and the power factor corrector 12 and the discharge circuit 22 is controlled by a control signal CS generated from the control circuit 23 to determine whether to be conducted. The power factor corrector 12 which is connected to between the discharge circuit 22 is for receiving the rectification signal, correcting current harmonic distortion, and outputting a stable DC signal. The output circuit 13 which is connected to the power factor corrector 12 is for receiving the DC signal and transforming various main power source with different voltage level to drive computer equipment, wherein the standby circuit 14 is connected to the output circuit 13 in parallel. The switch circuit 21 is controlled by a control signal CS generated from a control circuit 23. The single-direction pass circuit 24 is connected between the external power source 10 and the output circuit 13.

In a normal operating mode, e.g. when the output circuit 13 is in a conduction state and the external power source 10 is on, the switch circuit 21 conducts, such that the external power signal is transferred to an output circuit 13 by way of the rectifying circuit 11, the discharge circuit 22 and the power factor corrector 12 or by way of the single-direction pass circuit 24. Herein, the switch circuit 21 and the discharge circuit 22 are controlled to be conducted with respect to the output circuit 13 or by means of the control circuit 23. It is worth mentioned that the rectifying circuit 11 of the present embodiment may be a variety of different half-wave rectifier circuits or full-wave rectifier circuits. In the embodiment, a full bridge rectifier circuit is applied to perform full wave rectification of the external power signal.

In a standby operating mode, e.g. when the output circuit 13 is in a cutoff state and the external power source 10 is on, the switch circuit 21 will be cutoff with respect to the output circuit 13 or by means of the control circuit 23 at the same time, such that a first period or a second period of the external power signal is transferred to a standby circuit 14 through the single-direction pass circuit 24. In other words, when the output circuit 13 is off, the DC signal is transferred to the standby circuit 14, and then the standby circuit 14 receives the DC signal and outputs a standby power, so that the computer equipment is able to maintain a stable voltage in the standby mode, thereby consuming a minimum power at the same time.

Compared with the prior art, a strategy to deduct power consumption of the electrical power supply apparatus 2 is shutting down the output circuit 13 and controlling the transformation of the external power signal by utilizing the conduction state or cutoff state of the switch circuit 21 in the standby operating mode. For example, the switch circuit 21 in cutoff state is applied to transfer the first period or the second period of the external power signal to the standby circuit 14 for preventing power consumption associated with the rectifying circuit 11, the discharge circuit 22, and the power factor corrector 12. Accordingly, a certain periods of the external power signal is used to provide merely a certain portion of the power signal to the standby circuit 14, so that the power consumption of the rectifying circuit 11, the discharge circuit 22, and the power factor corrector 12 is prevented, thereby reducing the overall power consumption of the whole electrical power supply apparatus 2. In one embodiment, the first period of the external power signal is a positive half period and the second period of the external power signal is a negative half period, but the present embodiment is not limited thereto, wherein the external power signal is an AC signal.

In addition, the discharging circuit 22 is used for discharging the external capacitor (not shown in FIG. 3) parallel to the electrical power source 10 in response to a control signal CS generated from the control circuit 23. In other words, the control circuit 23 generates a control signal CS to control the switch circuit 21 and the discharge circuit 22 in response to the power signal of the external power source 10. Because the electrical power supply apparatus 2 has a discharge circuit 22, as the external power source 10 is removed, the discharge circuit 22 is controlled to be conducted by the control circuit 23, so that charges stored in the external capacitor are capable of discharging rapidly via a discharging path of the discharge circuit 22. Consequently, after the external power source 10 is removed, a charge storage capacity of the internal capacitive load in the electrical power supply apparatus 2 decreases rapidly, such that the power leakage current can be prevented and the discharging time can be controlled precisely.

In the follow-up embodiments, the instant disclosure will describe the part which is different from aforementioned embodiments of FIG. 3 and other ignoring part is the same as aforementioned embodiments of FIG. 3. Furthermore, similar reference numeral or mark indicate similar reference device for ease of explanation.

Figure 4:
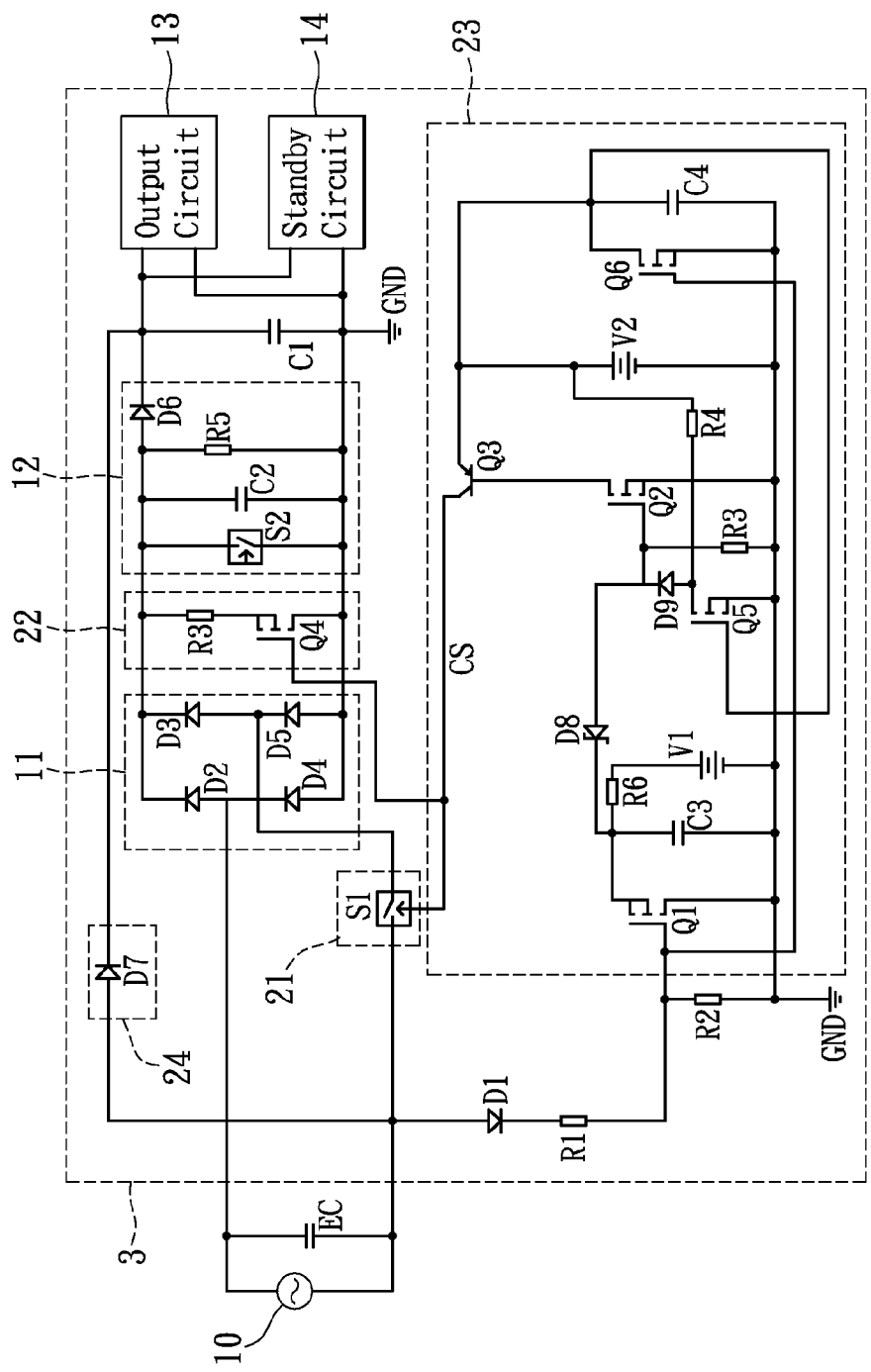
FIG. 4 shows a circuit diagram of the electrical power supply apparatus according to another embodiment of the present invention.

Next, please refer to FIG. 4, FIG. 4 shows a circuit diagram of the electrical power supply apparatus according to another embodiment of the present invention.

The FIG. 4 is a circuitry design with respect to the embodiment of the electrical power supply apparatus as shown in FIG. 3. As shown in FIG. 4, the single-direction pass circuit 24 includes a diode D7. The control circuit 23 includes transistor Q1, Q2, Q3, Q5, Q6 and DC power source V1 and V2. The discharge circuit 22 includes transistor Q4 and resistor R3.

The transistor Q1 is connected to the external power source 10 by way of a control terminal thereof. The transistor Q2 is connected to a first terminal of the transistor Q1 by way of a control terminal thereof. The transistor Q3 is connected to a first terminal of transistor Q2 by way of a control terminal thereof. The anode terminal of the DC power source V1 is connected to a first terminal of the transistor Q3 and the cathode terminal of the DC power source V1 is connected to the ground voltage GND. The transistor Q4 is connected to transistor Q3 by way of a control terminal thereof.

The transistor Q5 is connected is connected to the control terminal of the transistor Q2 by way of a first terminal thereof. The transistor Q6 is connected to the control terminal of the transistor Q1 by way of a control terminal thereof, the transistor Q6 is connected to a ground voltage GND and a second terminal of the transistor Q1 by way of a second terminal thereof, and the transistor Q6 is connected to a control terminal of the transistor Q5 by way of a first terminal thereof. The DC power source V2 is connected to the ground voltage GND by way of a negative terminal thereof, and The DC power source V2 is connected to the first terminal of the transistor Q5 by way of a positive terminal thereof.

In the present embodiment, the rectifying circuit 11 is a full bridge rectifier circuit, being composed of four diodes D2~D5. The switch circuit 21 is a switch S1 for demonstrated, but is not limited thereto. The power factor corrector 12 is composed of a capacitor C2, a resistor R5, a diode D6, and a switch S2, wherein the switch S2 is controlled by a power factor correction chip (not shown in FIG. 4). The output circuit 13 and the standby circuit 14 are respectively connected with the power factor corrector 12 and the output circuit 13 and the standby circuit 14 are connected in parallel, wherein the output circuit 13 and the standby circuit 14 are well known by the ones skilled in the art, therefore, merely connection relationship is shown herein.

The transistor Q4 of the discharge circuit 22 conducts in response to a control signal CS of the control circuit 23, e.g. the transistor Q4 conducts in response to the conduction of the transistor Q3, so as to rapidly discharge the external capacitance EC and the capacitive load of the electrical power supply apparatus 3 through the discharging path formed by the discharge circuit 22. The control circuit 23, connected to a terminal of the external power source 10 by way of a voltage divider circuit R1, R2, and a rectifying diode D1, concurrently controls the conduction state or cutoff state of the switch circuit 21 and the discharge circuit 22 in response to the external power signal. The diode D7 is for allowing the first period or the second period of the power signal of the external power source 10 transferred to the output circuit 13 and the standby circuit 14.

Wherein, in the embodiment, the transistors Q1, Q2, Q4, Q5, and Q6 are NMOS transistors, and a third transistor Q3 is a PNP transistor, and the ones who are skilled in the art are capable of applying any other types of transistors, switches or circuits to replace the aforementioned transistors. Furthermore, the control circuit 23 and the switch circuit 21 may be connected to any terminals of the external power source 10 so as to control the first period or the second period of the external power signal to transfer to the electrical power supply apparatus 2 according to the present invention.

While the computer equipment function in a normal operating mode, the external power signal is transferred to an output circuit 13 by way of the rectifying circuit 11, the discharge circuit 22 and the power factor corrector 12 or by way of the single-direction pass circuit 24. Furthermore, the electrical power supply apparatus 3 outputs a main power source to drive the computer equipment to function by means of the output circuit 13, wherein the main power source is either of or a combination of +5V, +/−12V, or +3.3V, etc., to facilitate the computer equipment to operate steadily. Conversely, while the computer equipment are turned off or in a standby operating mode, the output circuit 13 of the electrical power supply apparatus 3 turns off and the standby circuit 14 outputs a standby power to maintain the computer equipment stability in the standby operating mode.

In the standby operating mode, a negative half cycle period (e.g. a second period) of the external power signal is transferred to a standby circuit 14 through the diode D7. Furthermore, when the control circuit 23 receives the negative half cycle period of the external power signal by means of the rectifying diode D1 and the voltage divider circuit R1 and R2, and then the gate-to-source voltages Vgs of the transistor Q1 and the transistor Q6 are greater than its threshold voltage, and thus to be conducted. Therefore, the gate-source voltage Vgs of the fifth transistor Q5 is less than its threshold voltage and then to be cut off. Similarly, the gate-to-source voltage Vgs of the transistor Q2 has the same voltage level as the drain voltage Vd of the transistor Q1, and subsequently, the second transistor Q2 is cut off and then the third transistor Q3 is cut off too. Accordingly, in the standby operating mode, the switch S1 of the switch circuit 21 and the gate voltage Vg of the transistor Q4 of the output circuit 22 are at low voltage level simultaneously so as to be cut off in the standby operating mode.

It is to be noted that the second period (negative half cycle) of the external power signal is in a close circuit loop in the electrical power supply apparatus 3 and thus the second period of the external power signal may be transferred to the electrical power supply apparatus 3 and may be transferred to the standby circuit 14 directly through the path formed by the diode D7, so that the standby circuit 14 may generate the standby power.

In the other hand, since the existence of the diode D1 and D7 in this embodiment as the external power signal in the positive half cycle period, e.g. unable to conduct the diode D1 and D7, the control circuit 23 does not receive the positive half cycle period of the external power signal due to the diode D1 and the positive half cycle period of the external power signal is unable to be transferred to the electrical power supply apparatus 3. In other words, the positive half cycle period of the external power signal leads to an open circuit loop in the electrical power supply apparatus 3 due to cutoff state of the switch S1.

According to the present invention of the electrical power supply apparatus 3, there are no any power consumed by the rectifying circuit 11, the discharge circuit 22, the power factor corrector 12, and the output circuit 13 when the electrical power supply apparatus 3 operates in the standby operating mode. Moreover, the electrical power supply apparatus 3 merely transfers the negative half cycle of the external power signal to the standby circuit 14, such that the power consumption of the electrical power supply apparatus 3 is significantly reduced.

In addition, while a user removes the external power source 10, the internal stored power in the electrical power supply apparatus 3 must meet the second version of UL60950-1 safety requirements to be lower than 37% of the external power source 10 within one second after the external power source is removed, for preventing leakage current issues happening. Consequently, a discharge circuit 22 according to the present invention is designed to be conducted after the external power source 10 is removed, so as to facilitate the capacitive load of the electrical power supply apparatus 3 to discharge rapidly thru the discharge circuit 22, and also meet safety requirement of the second version of UL60950-1.

Because the external power signal provided by the external power source 10 has the first period and the second period, the external power signal may be either in the first period or in the second period as the external power source 10 is removed simultaneously. Accordingly, it is necessary to design circuitry with respect to the first period or the second period of the external power signal respectively, so that no matter how the external power signal is suddenly cut off, the external capacitance EC can perform discharging by means of conducting the discharge circuit 22.

Figure 5:
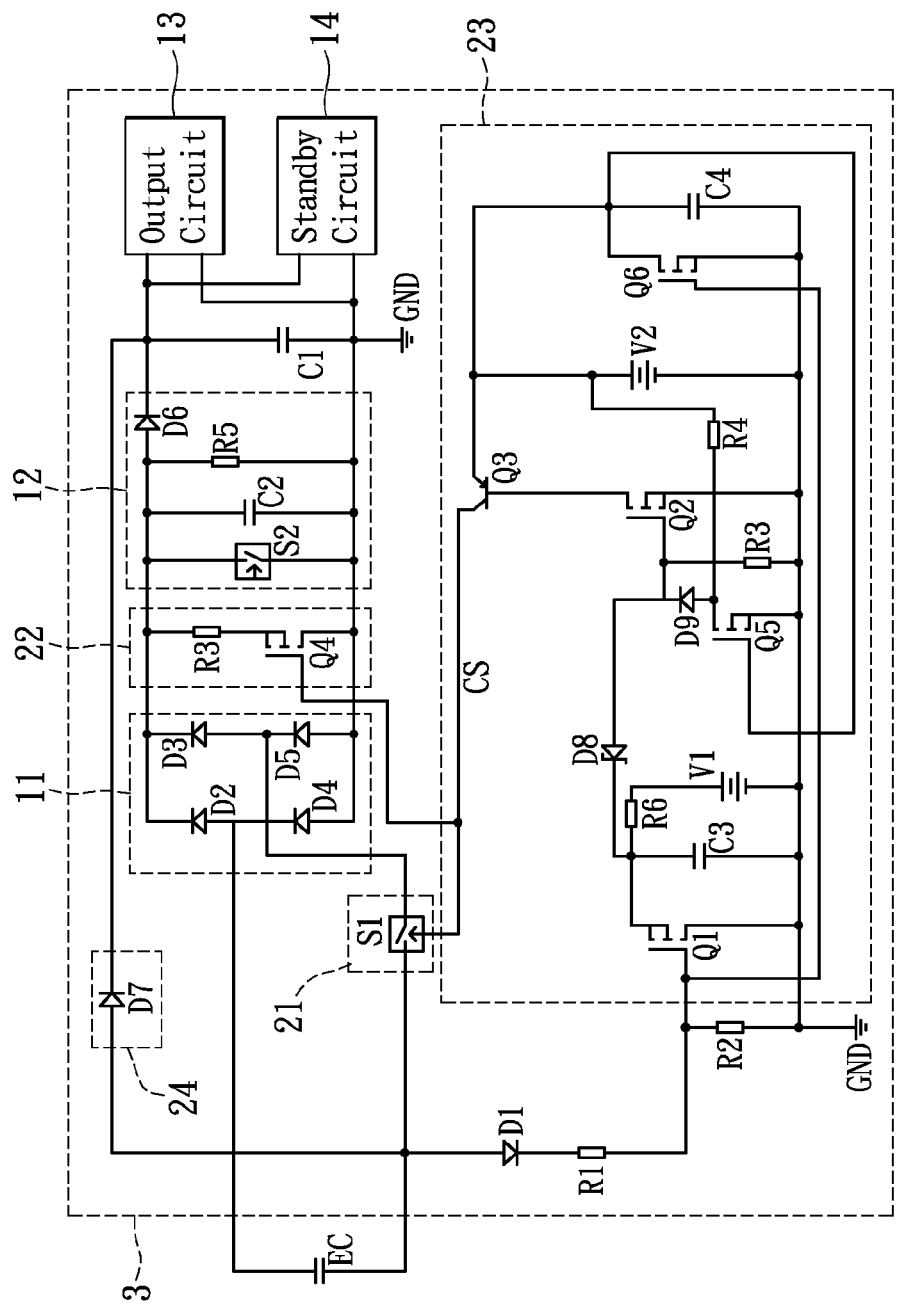
FIG. 5 shows a circuit diagram of the electrical power supply apparatus according to another embodiment of the present invention.

Next, please refer to FIG. 5, FIG. 5 shows a circuit diagram of the electrical power supply apparatus according to another embodiment of the present invention.

When the external power source 10 is removed and the external power signal is in the second period, e.g. the negative half cycle, the gate-to-source voltage Vgs of the transistor Q1 and the transistor Q6 are not lower than the threshold voltage simultaneously, such that the transistor Q1 and the transistor Q6 maintain for a period in the conduction state. Subsequently, the gate-source voltage Vgs of the transistor Q5 is less than the threshold voltage and the transistor Q5 is cut off in this moment. As a result, a DC power source V2 may drive the gate-to-source voltage Vgs of the transistor Q2 through a resistor R4 and a diode D9 to exceed the threshold voltage, thereby conducting the transistor Q2. Next, the transistor Q3 is conducted, such that the DC power source V2 is transferred to the switch S1 of the switch circuit 21 and the transistor Q4 of the discharge circuit 22, so that the switch S1 and the transistor Q4 are conducted and the external capacitance EC of the electrical power supply apparatus 3 may perform discharging through the discharging path which is composed of switch S1, the diode D3, the resistor R3 and the fourth transistor Q4.

In the other hand, while the external power source 10 is removed, and the external power signal is in the first period, e.g. the positive half cycle, the gate-to-source voltage Vgs of the transistor Q1 and the transistor Q6 are lower than the threshold voltage, such that the transistor Q1 and the transistor Q6 are in the cutoff state. Meanwhile, the transistor Q5 is conducted due to DC power V2. As a result, a DC power source V1 may perform charging by way of a resistor R6 and a capacitor C3 and drive the gate-to-source voltage Vgs of the transistor Q2 by way of a zener diode D8 to exceed the threshold voltage, thereby conducting the transistor Q2. Next, the transistor Q3 is conducted, such that the DC power source V2 is transferred to the switch S1 of the switch circuit 21 and the transistor Q4 of the discharge circuit 22, so that the switch circuit 21 and the discharge circuit 22 are conducted and the external capacitance EC of the electrical power supply apparatus 3 may perform discharging through the discharging path which is composed of the diode D2, the resistor R3 and the fourth transistor Q4.

Consequently, as per the aforementioned illustrations, as the external power source 10 is removed, no matter whether the external power signal is in either the first period or the second period, the discharge circuit 22 may be conducted, such that the external capacitance EC of the electrical power supply apparatus 3 may be discharged rapidly through the discharging path mainly generated by the discharge circuit 22. In the view of the embodiment according to the present invention, the built-in capacitive load of the electrical power supply apparatus 3 may be discharged to be below 37% of the charge storage capability of the external power source within 300 ms. Thus, the provided technical proposal is not merely decreasing the power consumption in the standby operating mode, but also meets the second version of UL60950-1 standards with respect to the discharging time.

Figure 6:
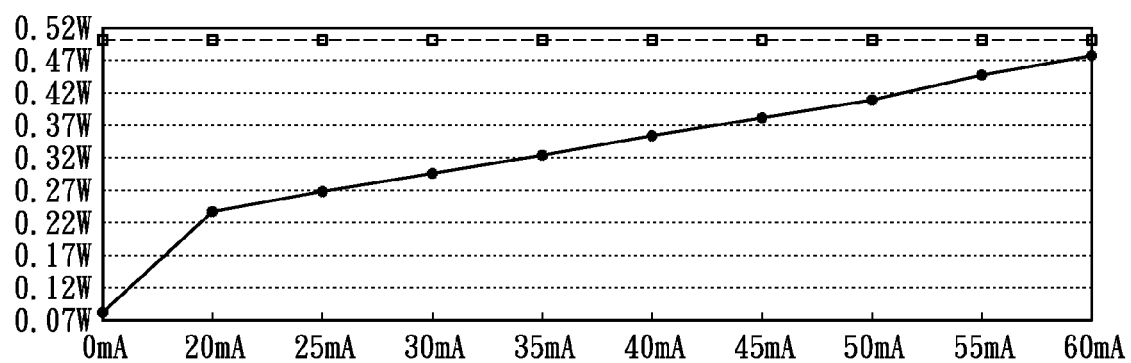
FIG. 6 illustrates a curve diagram in accordance with power consumption of the electrical power supply apparatus in a standby mode according to the present invention.

Finally, please refer to FIG. 6, in which a curve diagram in accordance with power consumption of the electrical power supply apparatus in a standby mode according to the present invention is demonstrated.

As per the aforementioned embodiment, while the electrical power supply apparatus 3 outputs a loading current around 50 mA to 60 mA in a standby operating mode, and the power consumption thereof is between 0.4 W to 0.48 W, the power consumption in accordance with the conventional power supply device 1 in the standby operating mode is significantly reduced, so that the electrical power supply apparatus 3 according to the present invention is capable of meeting the standards of EuP Directive 2013.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:
1. An electrical power supply apparatus, comprising:
   a switch circuit;

an output circuit, connected to an external power source, for outputting a supply of main power source;
a standby circuit, connected to the external power source and the output circuit, for providing a supply of standby power source;
a single-direction pass circuit, connected to the external power source, the output circuit and the standby circuit; and
a control circuit, connected to the external power source, the control circuit controlling a conduction state of the switch circuit according to a state of the external power source,
wherein when the external power source is on, the switch circuit is in a cutoff state for allowing a first period or a second period of a power signal of the external power source transferred to the standby circuit through the single-direction pass circuit.

2. The electrical power supply apparatus according to claim 1, further comprising:
a rectifying circuit, connected between the switch circuit and the output circuit;
wherein when the output circuit is in a conduction state and the external power source is on, the switch circuit is in the conduction state for allowing the first period or the second period of the power signal of the external power source transferred to the output circuit through the single-direction pass circuit or the rectifying circuit.

3. The electrical power supply apparatus according to claim 2, wherein the single-direction pass circuit includes:
A first diode, connected to the external power source by way of an anode terminal thereof, connected to the output circuit and the standby circuit by way of cathode terminal thereof, for allowing the first period or the second period of the power signal of the external power source transferred to the output circuit and the standby circuit.

4. The electrical power supply apparatus according to claim 3, wherein the first period is a positive half cycle period, the second period is a negative half cycle period, and the external power signal is an AC power signal.

5. The electrical power supply apparatus according to claim 1, wherein the control circuit includes:
a first transistor, connected to the external power source by way of a control terminal thereof, for being controlled by the power signal from the external power source;
a second transistor, connected to a first terminal of the first transistor by way of a control terminal thereof, for being cutting off in response to the conduction of the first transistor;
a third transistor, connected to a first terminal of the second transistor by way of a control terminal thereof, for being cutting off in response to the cutoff of the second transistor; and
a first DC power source, connected to a first terminal of the third transistor, for controlling the switch circuit by the third transistor.

6. The electrical power supply apparatus according to claim 1, further including:
a discharge circuit, connected between the output circuit and the external power source, for discharging an external capacitor parallel to the external power source by means of controlling the discharge circuit to be in a conduction state by the control circuit as the external power source is being removed.

7. The electrical power supply apparatus according to claim 6, wherein the discharge circuit includes:

a fourth transistor, connected to the third transistor by way of a control terminal thereof, for conducting in response to the conduction of the third transistor; and
a resistor, connected to a first terminal of the fourth transistor by way of a first terminal thereof, connected to the output circuit by way of a second terminal thereof.

8. The electrical power supply apparatus according to claim 5, wherein the control circuit further includes:
a fifth transistor, connected to the control terminal of the second transistor by way of a first terminal thereof;
a sixth transistor, connected to the control terminal of the first transistor by way of a control terminal thereof, connected to a ground voltage and a second terminal of the first transistor by way of a second terminal thereof, connected to a control terminal of the fifth transistor by way of a first terminal thereof; and
a second DC power source, connected to the ground voltage by way of a negative terminal thereof, connected to the first terminal of the fifth transistor by way of a positive terminal thereof.

9. The electrical power supply apparatus according to claim 8, wherein if the external power signal is during the second period as the external power source is removed, the first transistor and the sixth transistor maintain in a conduction state, the fifth transistor is in a cutoff state, the second DC power source drives the second transistor to be conducted, and then the third transistor is conducted, such that the second DC power source drives the discharge circuit and the switch circuit to be conducted by way of the third transistor.

10. The electrical power supply apparatus according to claim 8, wherein if the external power signal is during the first period as the external power source is removed, the first transistor and the sixth transistor are in a cutoff state, the fifth transistor is in a conduction state, the first DC power source drives the second transistor to be conducted, and then the third transistor is conducted, such that the second DC power source drives the discharge circuit and the switch circuit to be conducted by way of the third transistor.

11. A controlling method of an electrical power supply apparatus, comprising the steps of:
transferring a power signal to a output circuit through a single-direction pass circuit or a rectifying circuit when the electrical power supply apparatus is in a normal operating mode; and
controlling a switch circuit by way of a control circuit when the electrical power supply apparatus is in a standby operating mode, such that a first period or a second period of the power signal is transferred to a standby circuit through the single-direction pass circuit.

12. The controlling method according to claim 11, further including the steps of:
the control circuit conducts a discharge circuit and the switch circuit when an external power source is removed, such that an external capacitor connected with the external power source in parallel is discharged by means of the discharge circuit.

13. The controlling method according to claim 11, further including the steps of:
when the external power source is on, the switch circuit is in a cutoff state for allowing a first period or a second period of the power signal of the external power source transferred to the standby circuit through the single-direction pass circuit.

14. The controlling method according to claim 11, further including the steps of:
wherein when the output circuit is in a conduction state and the external power source is on, the switch circuit is in the conduction state for allowing the first period or the second period of the power signal of the external power source transferred to the output circuit through the single-direction pass circuit or the rectifying circuit.

15. The controlling method according to claim 11, wherein the single-direction pass circuit includes:

A first diode, connected to the external power source by way of an anode terminal thereof, connected to the output circuit and the standby circuit by way of cathode terminal thereof, for allowing the first period or the second period of the power signal of the external power source transferred to the output circuit and the standby circuit.

16. The controlling method according to claim 12, wherein the control circuit includes:

a first transistor, connected to the external power source by way of a control terminal thereof, for being controlled by the power signal from the external power source;

a second transistor, connected to a first terminal of the first transistor by way of a control terminal thereof, for being cutting off in response to the conduction of the first transistor;

a third transistor, connected to a first terminal of the second transistor by way of a control terminal thereof, for being cutting off in response to the cutoff of the second transistor; and a first DC power source, connected to a first terminal of the third transistor, for controlling the switch circuit by the third transistor.

17. The controlling method according to claim 12, wherein the discharge circuit includes:

a fourth transistor, connected to the third transistor by way of a control terminal thereof, for conducting in response to the conduction of the third transistor; and a resistor, connected to a first terminal of the fourth transistor by way of a first terminal thereof, connected to the output circuit by way of a second terminal thereof.

18. The controlling method according to claim 16, wherein the control circuit further includes:

a fifth transistor, connected to the control terminal of the second transistor by way of a first terminal thereof;

a sixth transistor, connected to the control terminal of the first transistor by way of a control terminal thereof, connected to a ground voltage and a second terminal of the first transistor by way of a second terminal thereof, connected to a control terminal of the fifth transistor by way of a first terminal thereof; and a second DC power source, connected to the ground voltage by way of a negative terminal thereof, connected to the first terminal of the fifth transistor by way of a positive terminal thereof.

19. The controlling method according to claim 18, wherein if the external power signal is during the second period as the external power source is removed, the first transistor and the sixth transistor maintain in a conduction state, the fifth transistor is in a cutoff state, the second DC power source drives the second transistor to be conducted, and then the third transistor is conducted, such that the second DC power source drives the discharge circuit and the switch circuit to be conducted by way of the third transistor.

20. The controlling method according to claim 18, wherein if the external power signal is during the first period as the external power source is removed, the first transistor and the sixth transistor are in a cutoff state, the fifth transistor is in a conduction state, the first DC power source drives the second transistor to be conducted, and then the third transistor is conducted, such that the second DC power source drives the discharge circuit and the switch circuit to be conducted by way of the third transistor.

* * * * *